Figure 1:
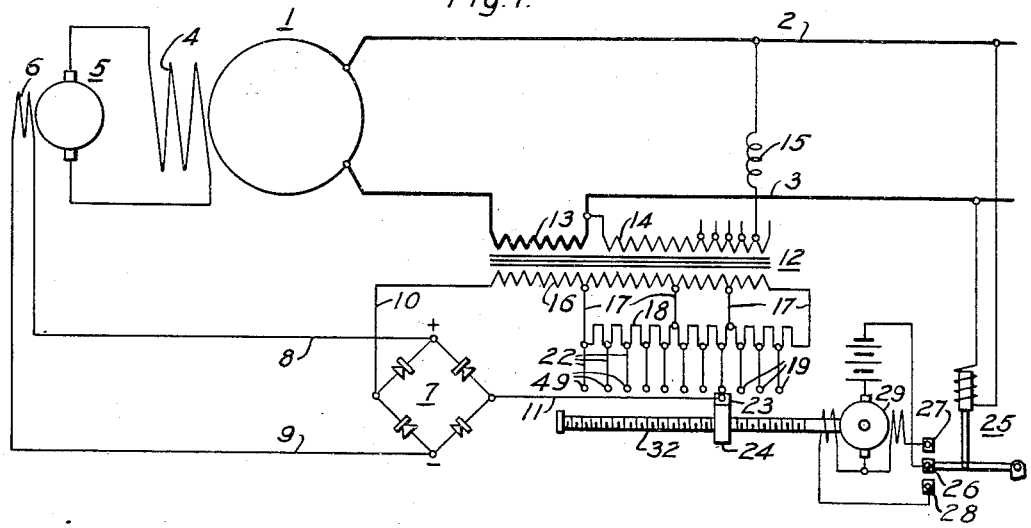

Aug. 6, 1940.   O. SCHMUTZ   2,210,688
REGULATION OF SYNCHRONOUS MACHINES
Filed June 8, 1939   3 Sheets-Sheet 3

WITNESSES:

INVENTOR
Oskar Schmutz.
BY Franklin E. Hardy
ATTORNEY

Patented Aug. 6, 1940

2,210,688

UNITED STATES PATENT OFFICE 2,210,688

REGULATION OF SYNCHRONOUS MACHINES

Oskar Schmutz, Berlin-Haselhorst, Germany, assignor to Westinghouse Electric & Manufacturing Company, East Pittsburgh, Pa., a corporation of Pennsylvania Application June 8, 1939, Serial No. 278,048
In Germany June 8, 1938

9 Claims. (Cl. 171—119)

The invention relates to equipment for automatically regulating the voltage of a synchronous generator in which the unidirectional field current of the generator, or of an exciter generator supplying exciting current to the field winding of the main generator, is supplied from the alternating current output of the main generator through rectifiers, the alternating voltage supply to the rectifiers being modified in accordance with variations in the load current.

The modifying or compensating equipment comprises a voltage transformer and a current transformer responsive to the output voltage and output current, respectively, of the main generator, or the two transformers may be combined in a single unit having two primary windings, one of which is energized in accordance with the generator load current and the other in accordance with the generator voltage, the circuit of the latter being through a series reactor. A controlling device may be provided between the alternating current source and the rectifier for controlling the alternating current voltage supplied to the rectifier in accordance with changes in the output voltage of the generator. The controlling device may include a plurality of tap connections from one of the transformer windings or from a resistor connected across one of the transformer windings and a movable tap contact member that is adapted to engage a selected one of the fixed contact members connected to the several tap connections.

When a regulating equipment is provided of the type including a variable resistor element in the field winding circuit for varying the resistance in the rectifier output circuit, the compounding circuit must be so designed that its internal resistance is very low so that the compounding current will develop a compensated alternating current voltage. It will be noted that it is not possible to connect a variable resistance element in parallel with the dry type rectifier without making major changes in design of such a regulating equipment, since such a parallel connected resistor of conventional design causes an increase in generator excitation upon an increase in generator voltage rather than the reverse.

It is an object of the present invention to provide equipment for automatically regulating the voltage of a synchronous generator whose field winding is energized either directly or from an exciter from the rectified alternating current voltage and current generated by a synchronous machine without the necessity of providing variable resistor means in the unidirectional portion of the circuit.

Other objects and advantages of the invention will be apparent from the following description of preferred embodiments thereof in which the six figures represent several preferred embodiments thereof.

In the drawings Figs. 1, 2, 5 and 6 are diagrammatic views of circuits and apparatus illustrating different preferred embodiments of the invention applied for controlling the excitation of a single phase generator.

Figure 3:
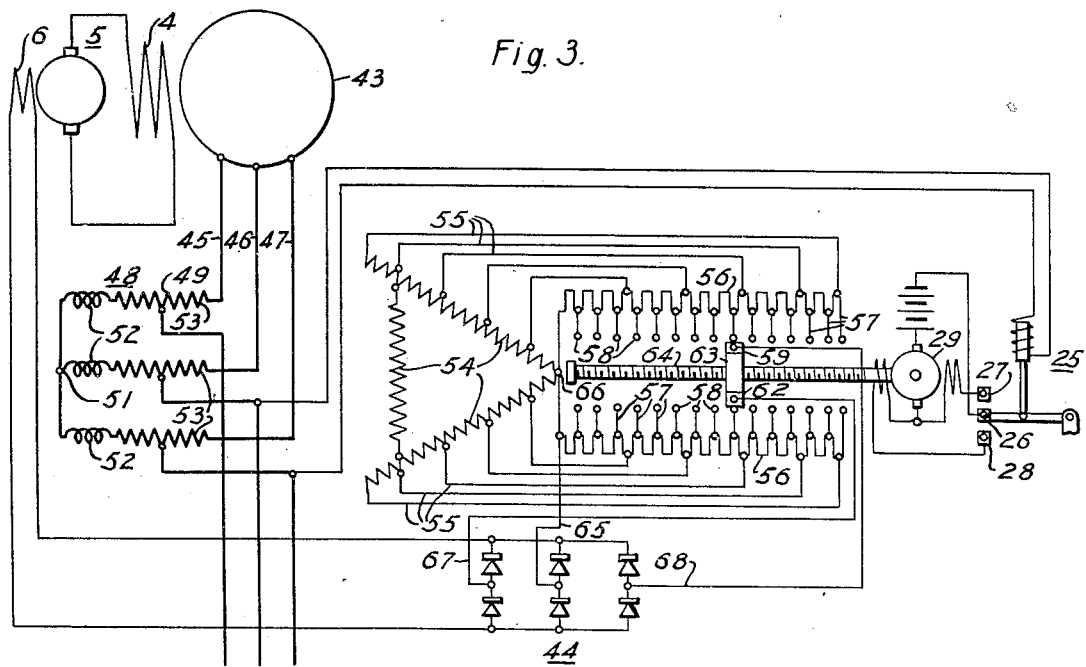
Figure 4:
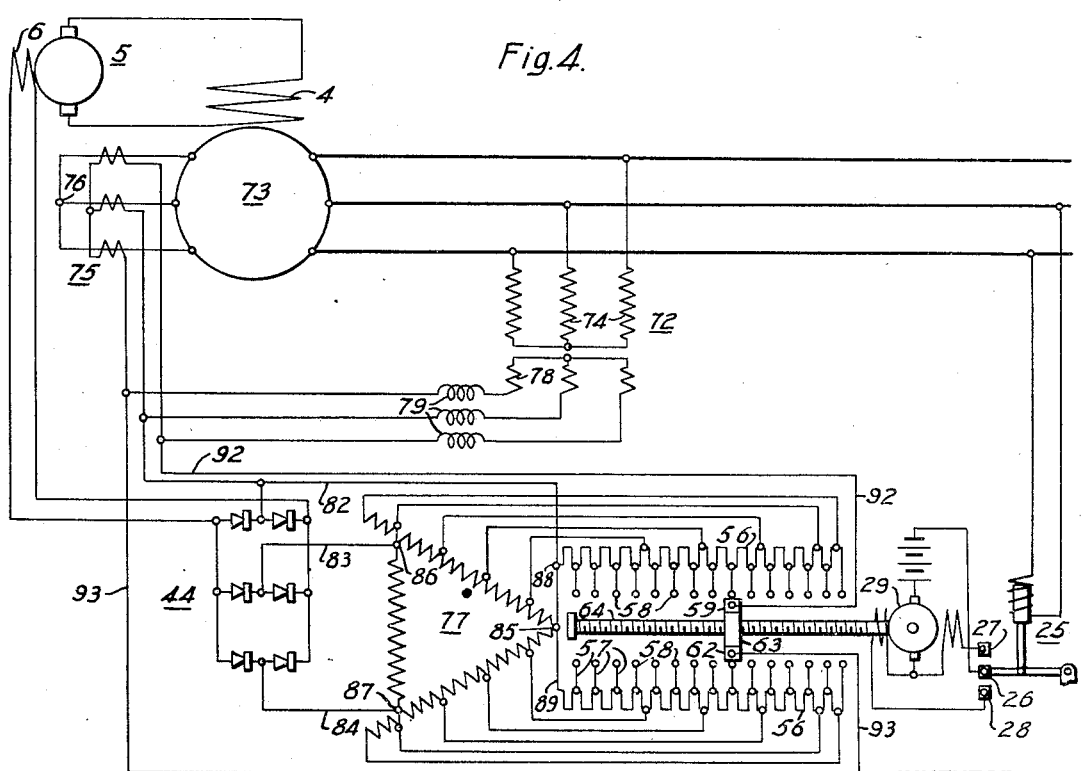

Figs. 3 and 4 are diagrammatic views of circuits and apparatus illustrating preferred embodiments of the invention applied for controlling the excitation of a three phase generator.

Referring to Fig. 1, the synchronous generator 1 is provided for supplying alternating current energy to a power circuit indicated by conductors 2 and 3, and is provided with a field winding 4, illustrated as energized from an exciter generator 5 having a field winding 6 that is connected by conductors 8 and 9 to the output terminals of a full wave rectifier 7. The alternating current terminals of the rectifier 7 are connected by conductors 10 and 11 to receive energy from a compounding transformer indicated generally at 12. The transformer 12 is provided with two primary windings 13 and 14, the winding 13 being directly connected in the alternating current circuit conductor 3 so as to be responsive to the current flowing therein, and the primary winding 14 being connected between circuit conductors 2 and 3 so as to be energized in accordance with the output voltage of the generator 1. A series reactor 15 is provided in series with the primary winding 14 to develop the proper phase relation between the energizing currents flowing in the primary windings 13 and 14.

The transformer 12 is provided with a secondary winding 16 from which a plurality of tap conductors 17 connect to various points along an ohmic resistor 18. A plurality of stationary tap contact members 19 are provided that are connected to the resistor 18 and to the secondary winding 16 through tap conductors 22. It will be noted that certain of the tap conductors 22 are connected to points along the resistor 18 intermediate the points to which the conductors 17 are connected.

A movable contact member 23 is carried by a contact carrying member 24 and actuated in the one or the other direction to engage one of the stationary contact members 19 in accordance with the operation of a voltage responsive relay element 25. The relay 25 is here illustrated as of the contact making volt-meter type, and is actuated in response to variations in the voltage between conductors 2 and 3, for causing a movable contact member 26 to engage the one or the other of two stationary contact members 27 or 28 to control the operation of a pilot motor 29 in the one or the other direction, in a well known manner for moving the contact carrying member 24 through the medium of a threaded shaft 32.

It wil be appreciated that the particular means shown for actuating the movable contact member 23 in accordance with variations in the voltage between conductors 2 and 3 is illustrative only, and any convenient mechanism for varying the movable contact member of a rheostat to engage one of a plurality of stationary contact members may be employed.

The necessity of providing a large number of taps in the secondary winding 16 is avoided by the use of the ohmic resistor 18 from which additional tap connections are made to certain of the stationary contact members of the regulator, and which are directly connected to the resistor between the points of the resistor that are connected to the secondary winding of the transformer. With this arrangement of the circuits, if the influence of the current transformer winding predominates over the voltage winding, the field current of the generator will decrease when the regulator operates to increase the effective number of turns of the secondary winding 16 connected in the circuit supplying the rectifier 7.

When the internal resistance of the compounding transformer is high, the current flowing in the secondary winding 16 is determined exclusively by the current flowing through the reactor 15 and the current of the synchronous machine and is independent of the resistances of the rectifier 7 and the field winding 6. In certain situations therefore (as where the generator is supplying a highly capacitive load current) the field current could only be reduced to zero by increasing the number of turns of the secondary winding 16 of the current transformer indefinitely which is, of course, impossible.

Figure 2:
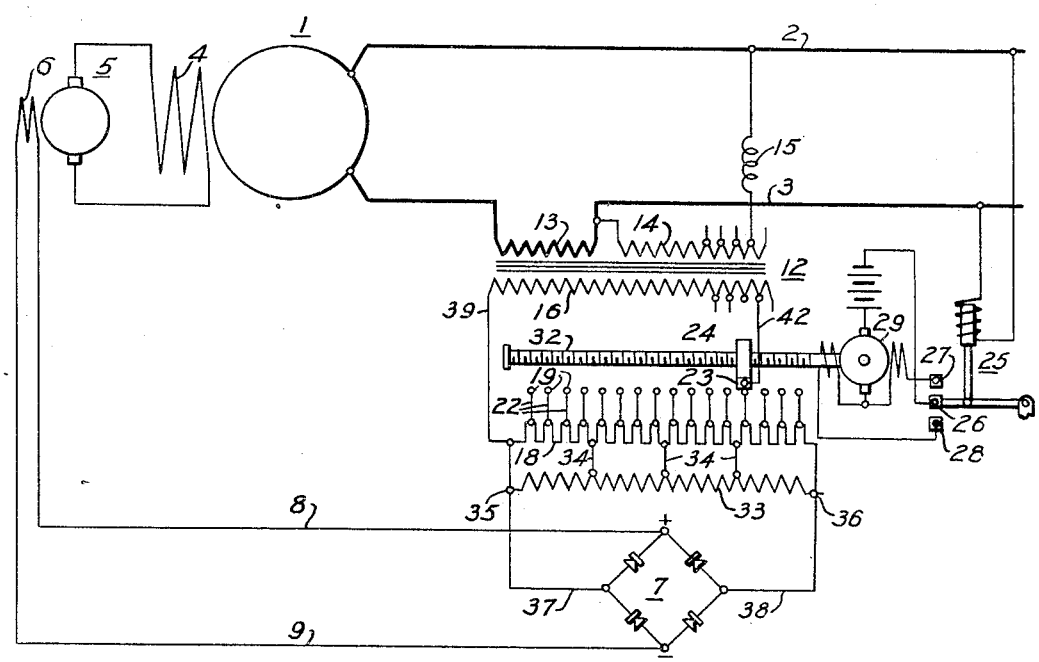

This disadvantage may be overcome by employing the circuit arrangement shown in Fig. 2 in which the compounding transformer 12 energizes an intermediate transformer 33 here shown as an auto-transformer, the primary side of which is provided with tap connections 34 connected to spaced points along the resistor 18 and the secondary terminals 35 and 36 of which are connected by conductors 37 and 38 to supply the alternating current side of the rectifier 7. It will be noted that one terminal of the winding 16 is connected by conductor 39 to one end of the resistor 18 and to the terminal 35 of the intermediate transformer winding 33, and that the other terminal of the winding 16 is connected through conductor 42 and the movable contact member 23 to apply the output voltage of the winding 16 to a variable portion of the winding 33 as determined by the operation of the regulator motor 29.

The operation of the mechanism shown in Fig. 2 is different from that shown in Fig. 1, in that the regulating action merely involves a gradual reduction in the effective primary turns of the winding of the intermediate transformer so that the regulator may now reduce the field current to zero.

In the case of a large machine supplying a three-phase output, it is desirable to provide an arrangement that will provide energy available for increasing the excitation of the generator, even though a single-phase short-circuit should occur. The apparatus shown in Fig. 3 makes this provision. In Fig. 3 a generator 43 is shown having a field winding 4 supplied as in Figs. 1 and 2 from an exciter generator 5 having a field winding 6 that is supplied from a six-element rectifier unit 44. The three-phase output of the generator 43 is indicated by the circuit conductors 45, 46 and 47 to which a compounding transformer 48 is connected having three primary windings 49 that are connected in star relation between the three-phase conductors and through reactors 52 to a neutral point 51. The portions 53 of the windings 49 are connected in series circuit with their respective phase conductors so that the turns of these portions of the winding carry the phase load current which is superimposed upon the current flowing through the reactor windings 52.

Secondary windings 54 are provided for the current transformer 48 and are connected in delta relation, two of the windings being provided with tap connections 55 between spaced intervals along the winding and spaced intervals along resistors 56 from which additional tap connections 57 are connected to fixed contact members 58. The contact members 58 are engaged by movable contact members 59 and 62 carried by block 63 that is moved by a threaded shaft 64 in accordance with the operation of the pilot motor 29 as in Figs. 1 and 2. The dry type rectifier 44 consists of six rectifier elements arranged in pairs as shown and supplied from three primary leads, the lead 65 coming from the junction point 66 between the two tapped secondary windings 54, the lead 67 being connected to the movable contact member 62, and the lead 68 being connected to the movable contact member 69.

With the arrangement of the apparatus as shown in Fig. 3, it is advisable to make the internal resistance of the compounding transformer 48 as small as possible in comparison with the resistance of the field winding circuit in order to be able to reduce the field current substantially to zero without saturating the current transformer. The arrangement shown in Fig. 3 may be modified by providing the current transformer 48 with two phase windings only and two reactor windings 52 connected in open delta. With this arrangement the middle winding phase of the primary, as well as the winding phase without taps of the secondary of the transformer 48 is omitted, and the third phase winding of the reactor 52 is likewise omitted. With this arrangement the neutral point 51 of the reactor is connected to the neutral point of the generator.

Referring to Fig. 4 of the drawings, a three-phase system is illustrated in which the compounding transformer arrangement has an internal resistance that is high in comparison with the resistance of the field winding of the circuit. The generator 73 is similar to the generator 43 in Fig. 3, and is similarly energized from the exciter generator 5. The compounding transformer arrangement of this system includes three transformers, namely, a three-phase voltage transformer 72 having primary windings 74 connected in star relation to the circuit, a three-phase current transformer 75 connected in the main or alternating current circuit of the generator 73 adjacent the neutral point 76 of the circuit and an intermediate transformer 77 in the form of an auto-transformer. The secondary windings 78 of the voltage transformer are connected in series with reactors 79, one in each phase circuit, and the two transformers 75 and 72 are connected to energize the intermediate transformer 77 in parallel. The windings of the transformer 77 are connected to the resistors 56 in the same manner as are the windings 54 in Fig. 3.

In the modification shown in Fig. 4, the three conductors 82, 83 and 84 supplying the rectifier unit 44 are connected to junction points 85, 86 and 87, respectively, on the three windings of the auto-transformer 77. The conductor 82 is also connected to the terminals 88 and 89 of the resistors 56. It will be noted that the conductor 82 is also connected to one of the secondary windings of the current transformer 75 and that the other two secondary windings are connected through conductors 92 and 93, respectively, to the movable contact members 59 and 62 that are actuated by the motor 29 in accordance with the line voltage as controlled by the contact making voltmeter 25 in the same manner as in the previously described modifications. When the system illustrated in Fig. 4 is employed, the regulator is capable of reducing the current flowing in the field winding 6 to zero while gradually reducing the effective number of primary turns of the intermediate transformer 77.

Figure 5:
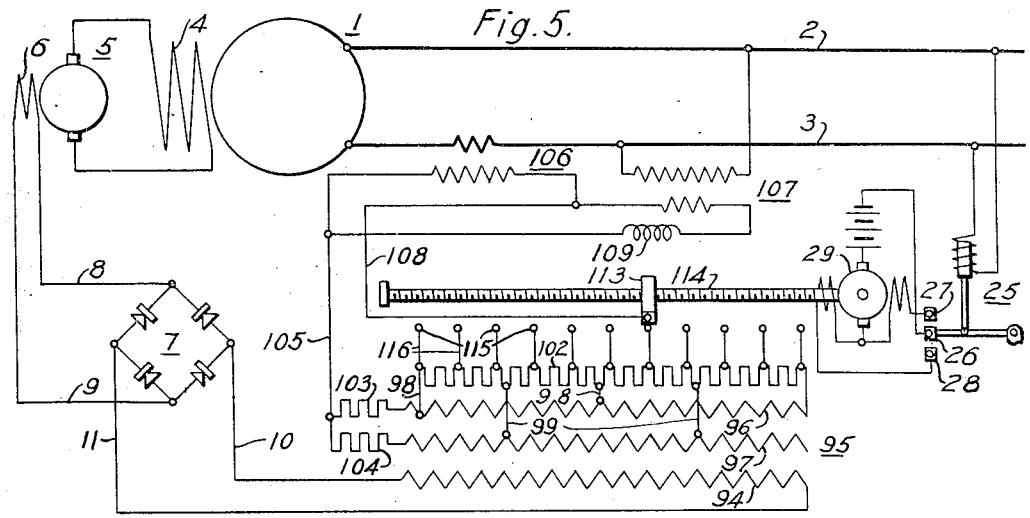

Referring to Fig. 5 of the drawings, the generator 1, the exciter generator 5 and rectifier 7 correspond to the arrangement shown in Fig. 1. The rectifier 7 is supplied with alternating current energy through conductors 10 and 11 from a secondary winding 94 of a tertiary transformer 95 having two primary windings 96 and 97. The windings 96 and 97 are provided with tap conductors 98 and 99, respectively, at spaced intervals along the windings which connect with alternate points along a resistor 102 in the manner shown. Resistors 103 and 104 are provided between the ends of the primary windings 96 and 97 and the circuit conductor 105 through which it is supplied. Energy from the power circuit conductors 2 and 3 connected with the synchronous generator 1 is supplied through a current transformer 106 and a voltage transformer 107, the secondary windings of which are connected in parallel between conductors 105 and 108, the winding from the voltage transformer including a reactor 109. The conductor 108 is connected to the movable contact member 112 carried by a block 113 that is moved by the screw-threaded shaft 114 as controlled by the motor 29 and contact making voltmeter 25 in the same manner as in the previously described embodiments of the invention. The movable contact member 112 engages one of a plurality of fixed contact members 115 that are connected through tap conductors 116 to spaced points along the resistor 102.

It will be appreciated that as the movable contact member 112 is operated it will always be in engagement with at least one of the stationary contact members 115 and in certain positions will be in engagement with adjacent contact members. The resistors 103 and 104 limit the flow of current between the windings when the movable contact member 112 is in engagement with more than one of the fixed contact members 115.

Figure 6:
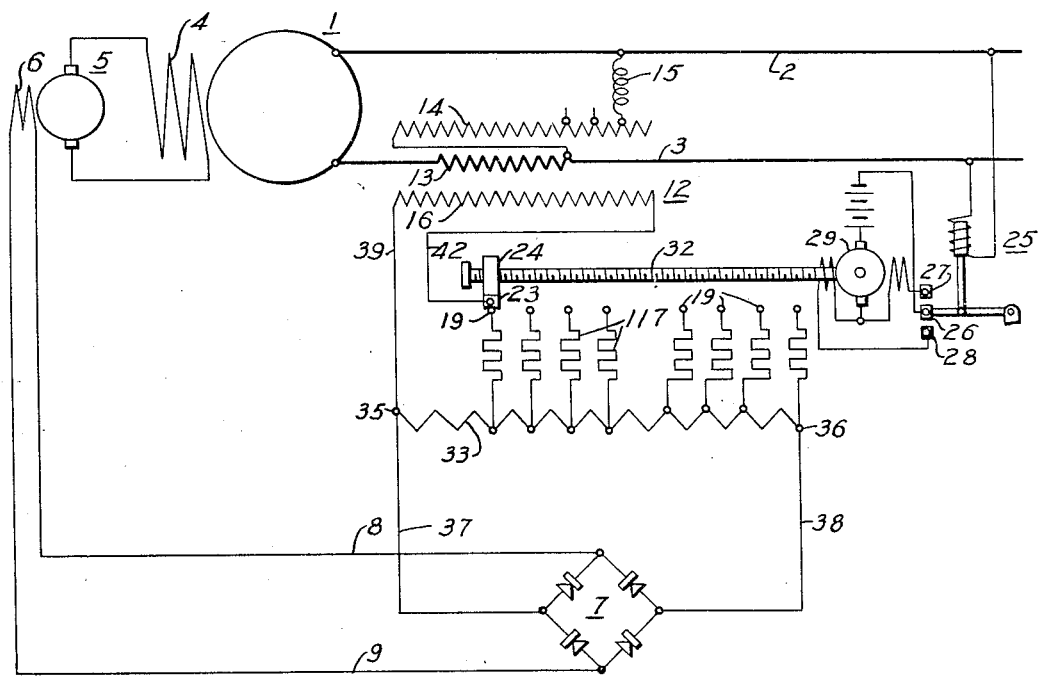

Referring to Fig. 6 of the drawings, the embodiment there illustrated includes a compounding transformer 12, synchronous generator 1, exciter generator 5 and rectifier unit 7 corresponding to that shown in Fig. 2. In the embodiment illustrated in Fig. 6, in place of the resistor 18 provided in Fig. 2, the several contact members 19 are connected to spaced points along the winding 33 through individual resistors 117. If two adjacent stationary contacts 19 are short-circuited by the movable contact member 23, only a current of limited intensity can flow therethrough by virtue of the resistors 117.

Many modifications of the invention will occur to those skilled in the art within the spirit of my invention, and I do not wish to be limited otherwise than by the scope of the appended claims.

I claim as my invention:

1. In a regulator system for alternating current generators, means for governing the excitation of the generator comprising a field winding, a rectifier for supplying unidirectional current to the field winding, means for supplying alternating current from said generator to said rectifier comprising a transformer having two primary windings and a secondary winding, means for energizing one of the primary windings in accordance with the generator voltage and means for energizing the other of the primary windings in accordance with generator current, a reactor connected in series with the first named primary winding, tap changing means for varying the voltage applied from said transformer to said rectifier, and means responsive to the generator voltage for controlling the tap changing means.

2. In a regulator system for alternating current generators, means for governing the excitation of the generator comprising a field winding, a rectifier for supplying unidirectional current to the field winding, means for supplying alternating current from said generator to said rectifier comprising a transformer having a winding energized in accordance with the generator current and a winding energized in accordance with the generator voltage, a reactor connected in series with the last named winding, a regulator having a plurality of stationary contact members connected to taps spaced along one transformer winding and a movable contact member, and means responsive to the generator voltage for controlling the movable contact member for varying the voltage applied to said rectifier.

3. In a regulator system for alternating current generators, means for governing the excitation of the generator comprising a field winding, a rectifier for supplying unidirectional current to the field winding, means for supplying alternating current from said generator to said rectifier comprising a transformer having a winding energized in accordance with the current of the generator and a winding energized in accordance with the voltage of the generator, a reactor connected in series with the last named winding, a regulator having a plurality of stationary contact members connected to taps spaced along one transformer winding and intermediate contact members connected to taps along ohmic resistors connected between pairs of adjacent transformer winding taps.

4. In a regulator system for polyphase alternating current generators, means for governing the excitation of the generator comprising a field winding, a rectifier for supplying unidirectional current to the field winding, means for supplying alternating current from said generator to said rectifier comprising a polyphase current transformer whose primary winding is energized as a measure of the generator load current and a polyphase voltage transformer having a secondary winding circuit including reactor windings, an intermediate auto-transformer having primary tap conductors and stationary contact members connected to spaced points therealong and secondary terminals connected to the rectifier, and means responsive to the generator voltage for varying the connection of said tap connections to the source of alternating current.

5. In a regulator system for alternating current generators, means for governing the excitation of the generator comprising a field winding, a rectifier for supplying unidirectional current to the field winding, means for supplying alternating current from said generator to said rectifier comprising a transformer having a winding energized in accordance with the current of the generator and a winding energized in accordance with the voltage of the generator, a reactor connected in series with the last named winding, said transformer being equipped with a plurality of windings each provided with tap connections separated from one another by ohmic resistors, and means responsive to generator voltage for correspondingly varying the tap connections for controlling the alternating voltage supplied to the rectifier.

6. In a regulator system for a synchronous generator, means for governing the excitation of said generator comprising a field winding, a rectifier for supplying unidirectional current to the field winding, and means for supplying an alternating current from said generator to said rectifier comprising a transformer circuit including a winding energized in accordance with the generator voltage, a reactor in series therewith, and a winding energized in accordance with the generator current that is energized both in accordance with the current and the voltage of the generator.

7. In a regulator system for a synchronous generator, means for governing the excitation of said generator comprising a field winding, a rectifier for supplying unidirectional current to the field winding, and means for supplying an alternating current from said generator to said rectifier comprising a transformer circuit including a winding energized in accordance with the generator voltage, a reactor in series therewith, and a winding energized in accordance with the generator current, one of said transformer windings being provided with tap connections, a tap changing switch and means responsive to the voltage of the generator for operating the tap changing switch for varying the alternating voltage supplied to the rectifier.

8. In a regulator system for alternating current generators, means for governing the excitation of the generator comprising a field winding, a rectifier for supplying unidirectional current to the field winding, means for supplying alternating current from said generator to said rectifier comprising a transformer having two primary windings and a secondary winding, means for energizing one of the primary windings in accordance with the generator voltage and means for energizing the other of the primary windings in accordance with generator current, a reactor connected in series with the first named primary winding, tap changing means for varying the voltage applied from said transformer to said rectifier including a resistor, a plurality of tap connections between said resistor and said secondary winding, and a larger number of tap connections from said resistor to separate contact members and means responsive to the generator voltage for controlling the tap changing means.

9. In a regulator system for alternating current generators, means for governing the excitation of the generator comprising a field winding, a rectifier for supplying unidirectional current to the field winding, means for supplying alternating current from said generator to said rectifier comprising a transformer energized both in accordance with the current and the voltage of the generator, a regulator including a resistor, conductors between spaced points along one transformer winding and spaced points along said resistor, a plurality of stationary contact members connected to taps spaced along said resistor, certain of said connections being to points on the resistor, intermediate points thereon that are connected to said winding, and a movable contact member, and means responsive to the generator voltage for controlling the movable contact member for varying the voltage applied to said rectifier.

OSKAR SCHMUTZ.